(No Model.) 9 Sheets—Sheet 1.

E. E. ELDER.
MACHINE FOR MAKING BUNGS.

No. 527,952. Patented Oct. 23, 1894.

WITNESSES. INVENTOR.
J. M. Dolan Edward E. Elder
J. T. Ball by his attys
 Clarke & Raymond (No Model.)  9 Sheets—Sheet 3.

E. E. ELDER.
MACHINE FOR MAKING BUNGS.

No. 527,952. Patented Oct. 23, 1894.

WITNESSES.
J. M. Dolan.
J. T. Ball.

INVENTOR.
Edward E. Elder
by his attys
Clarke & Raymond (No Model.) 9 Sheets—Sheet 4.

E. E. ELDER.
MACHINE FOR MAKING BUNGS.

No. 527,952. Patented Oct. 23, 1894.

WITNESSES.
J. M. Dolan.
J. T. Ball.

INVENTOR.
Edward E. Elder
by his attys
Clarke & Raymond

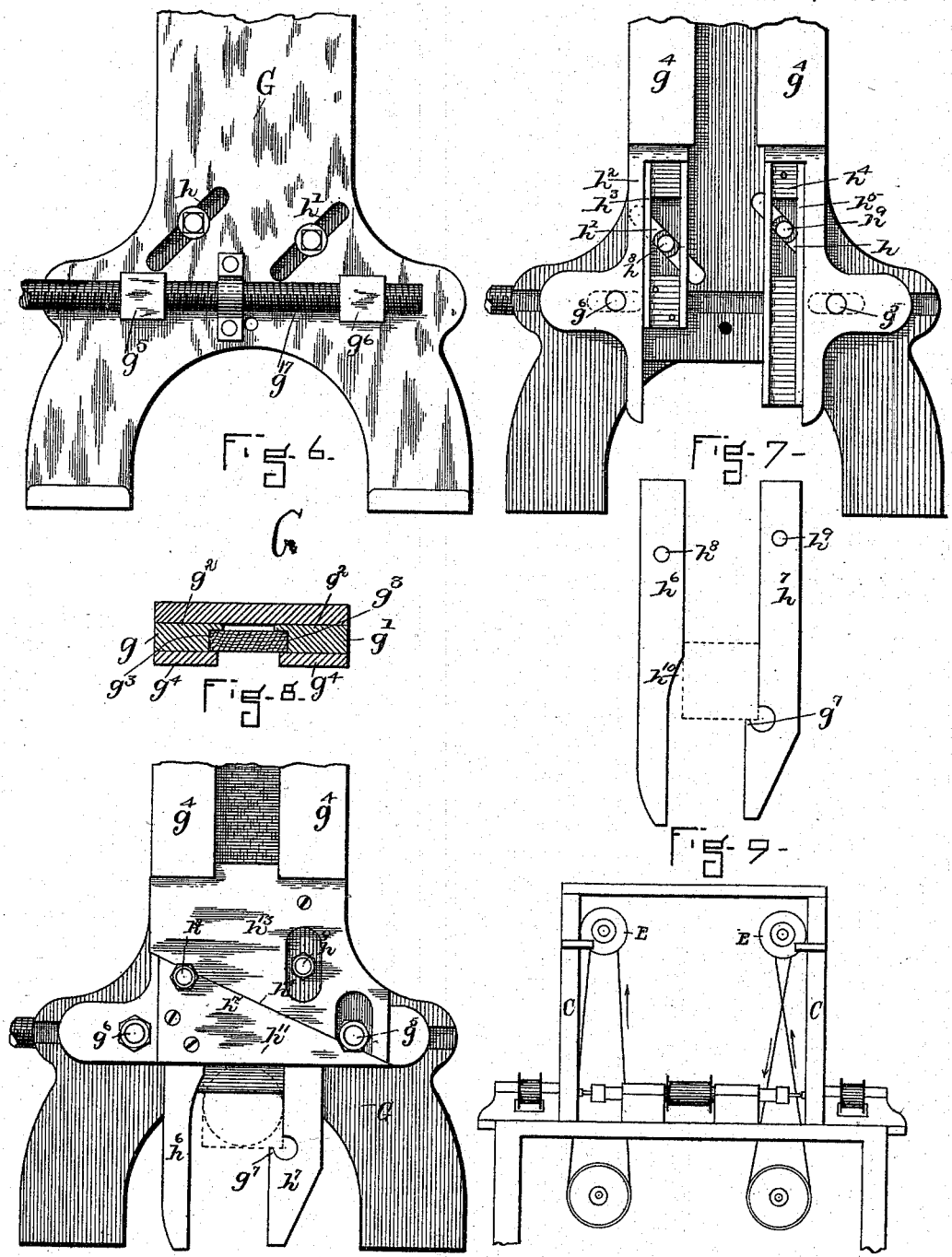

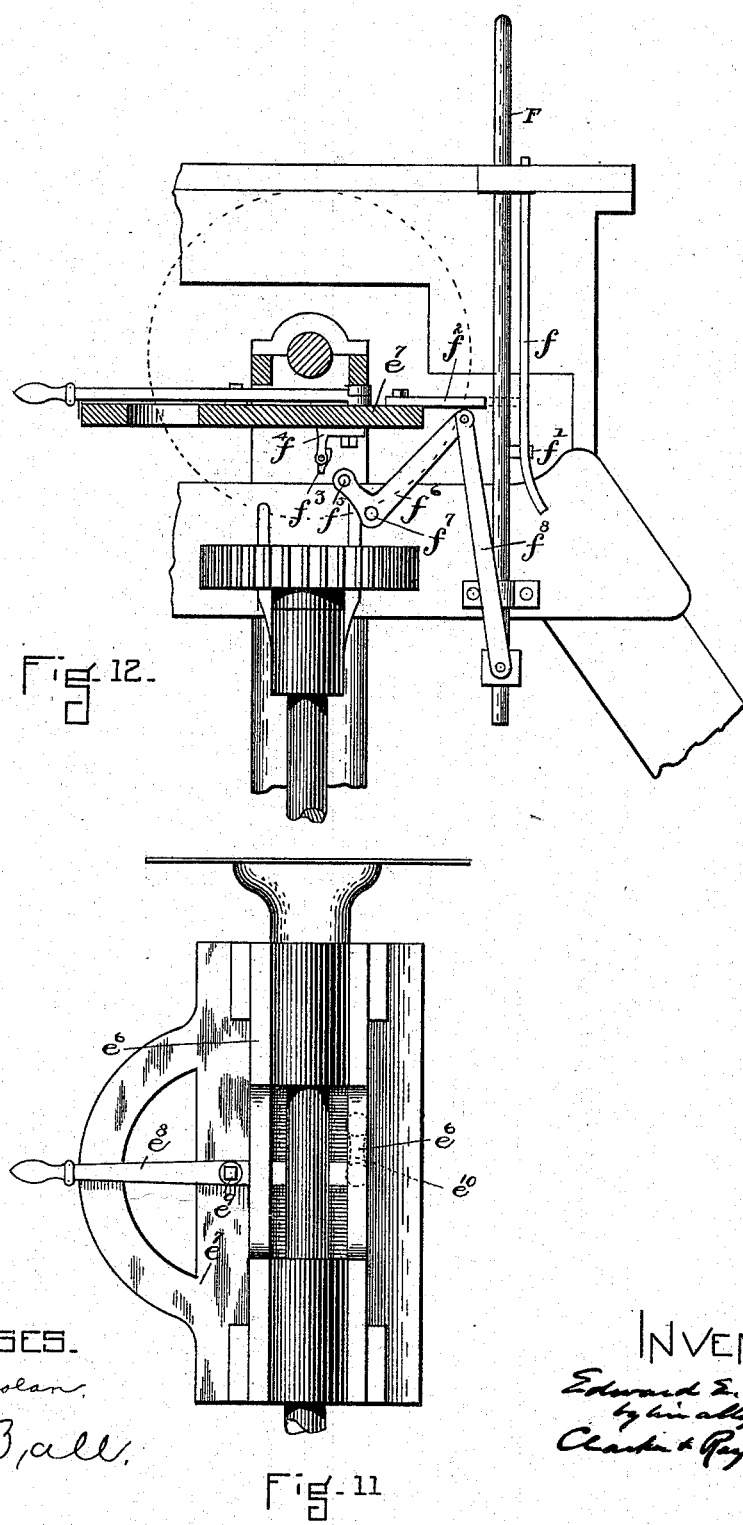

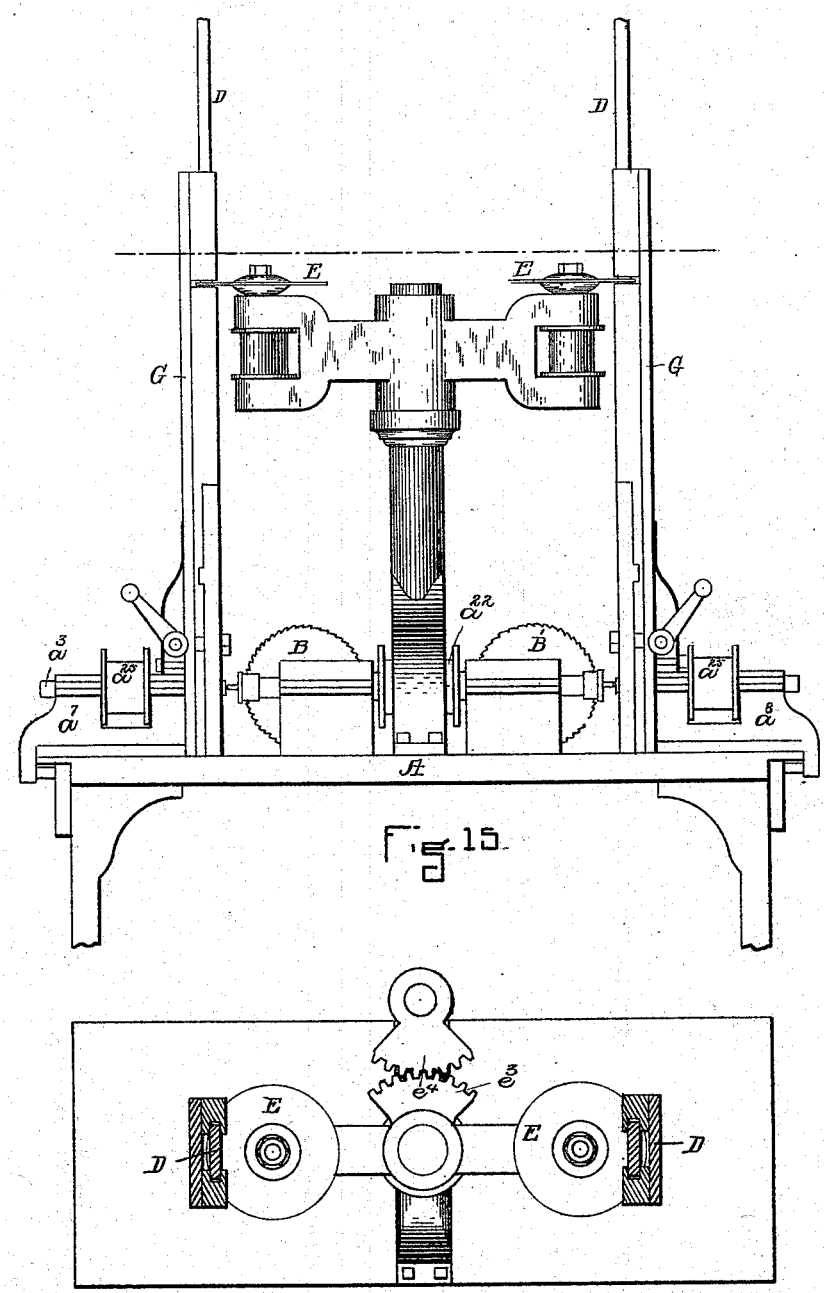

(No Model.) 9 Sheets—Sheet 8.
E. E. ELDER.
MACHINE FOR MAKING BUNGS.
No. 527,952. Patented Oct. 23, 1894.
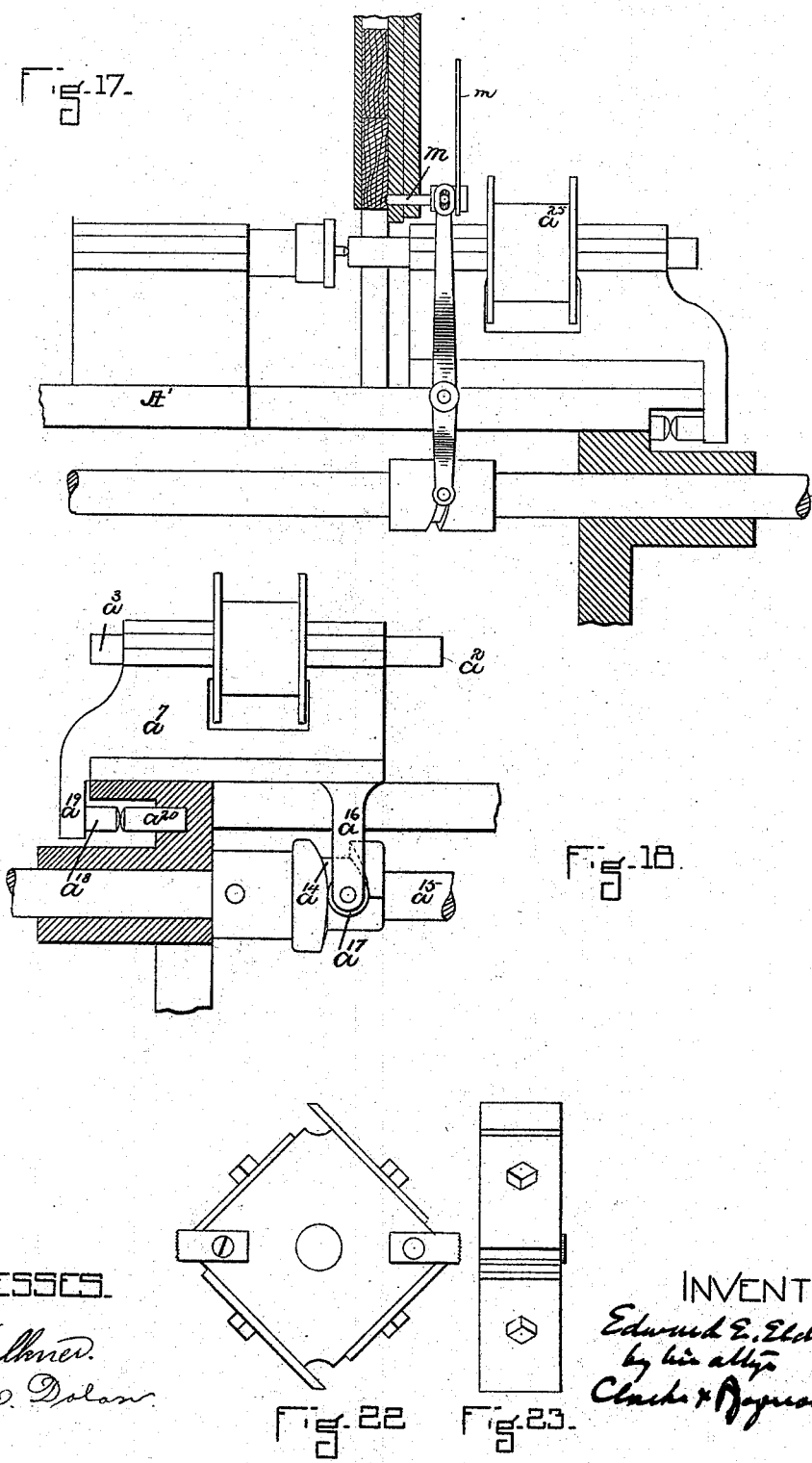
WITNESSES
F. Faulkner.
J. M. Dolan.
INVENTOR
Edward E. Elder
by his atty
Clarke & Raymond (No Model.) 9 Sheets—Sheet 9.
E. E. ELDER.
MACHINE FOR MAKING BUNGS.
No. 527,952. Patented Oct. 23, 1894.
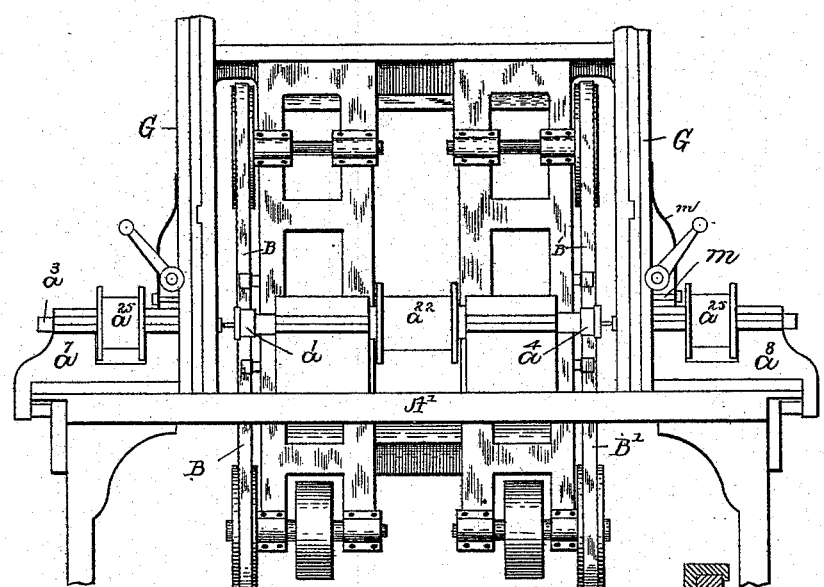
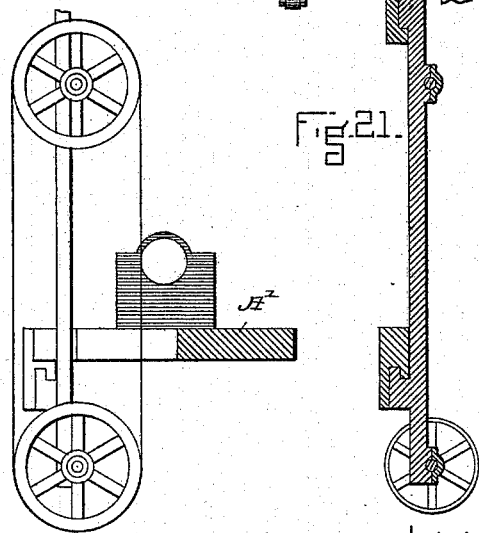
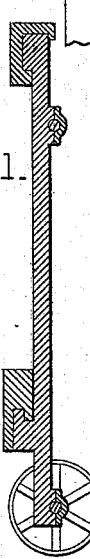
WITNESSES.
F. Faulkner.
J. M. Dolan.
INVENTOR.
Edward E. Elder
by his attys
Clarke & Raymond

UNITED STATES PATENT OFFICE.

EDWARD E. ELDER, OF LYNN, MASSACHUSETTS.

MACHINE FOR MAKING BUNGS.

SPECIFICATION forming part of Letters Patent No. 527,952, dated October 23, 1894.

Application filed July 13, 1889. Serial No. 317,392. (No model.)

*To all whom it may concern:*

Be it known that I, EDWARD E. ELDER, a citizen of the United States, residing at Lynn, in the county of Essex and State of Massachusetts, have invented a new and useful Improvement in Machines for Making Bungs, of which the following is a full, clear, and exact description, reference being had to the accompanying drawings, forming a part of this specification, in explaining its nature.

The invention is an improvement upon that described in my Letters Patent No. 373,345, dated November 15, 1887, and it relates especially to the organization in a machine of the character described in said patent of an automatic feed for automatically supplying the bung blocks to the bung shaping devices.

It further relates to various details of construction and organization to which reference will hereinafter be made.

Figure 1:
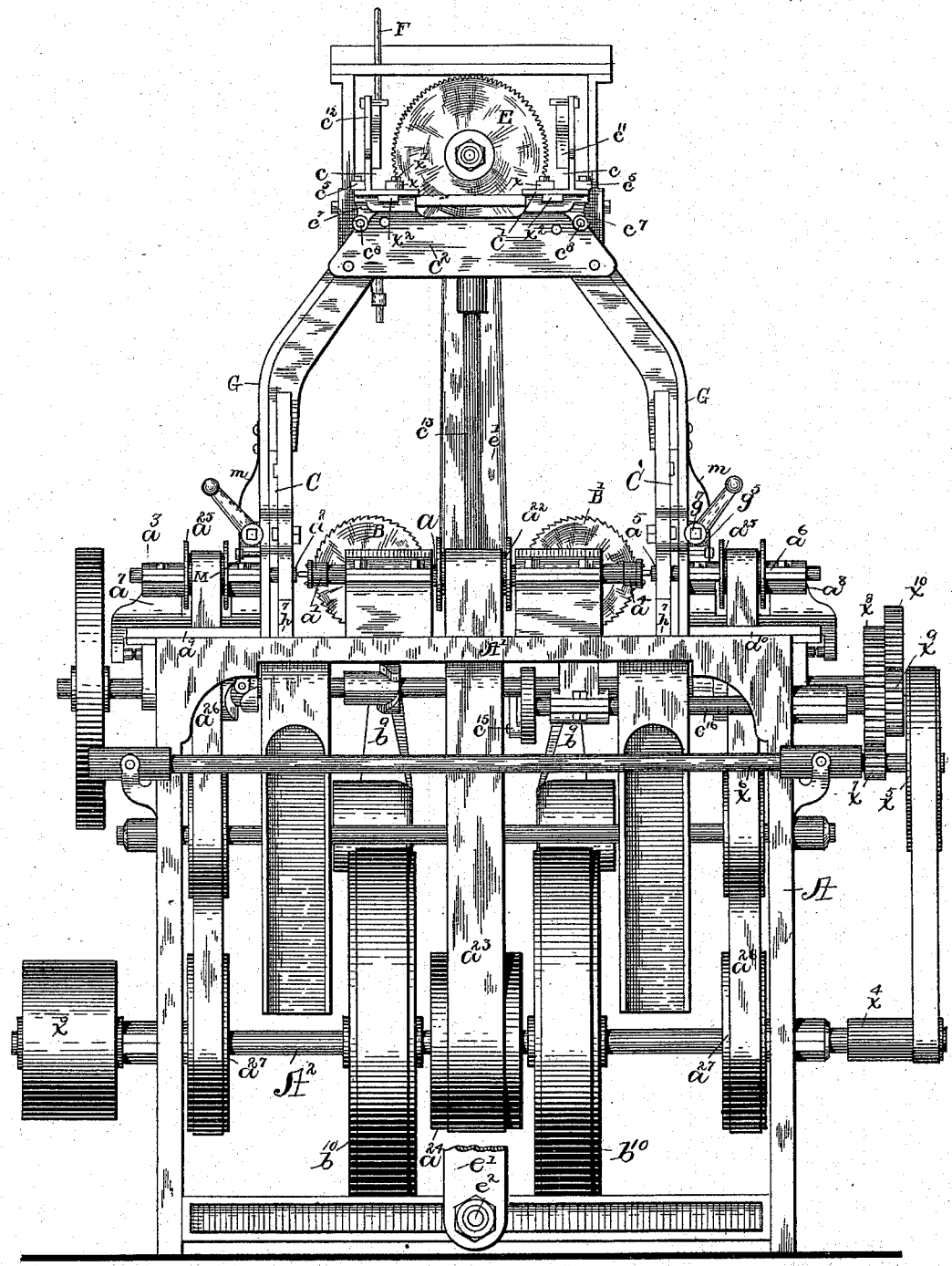
Figure 2:
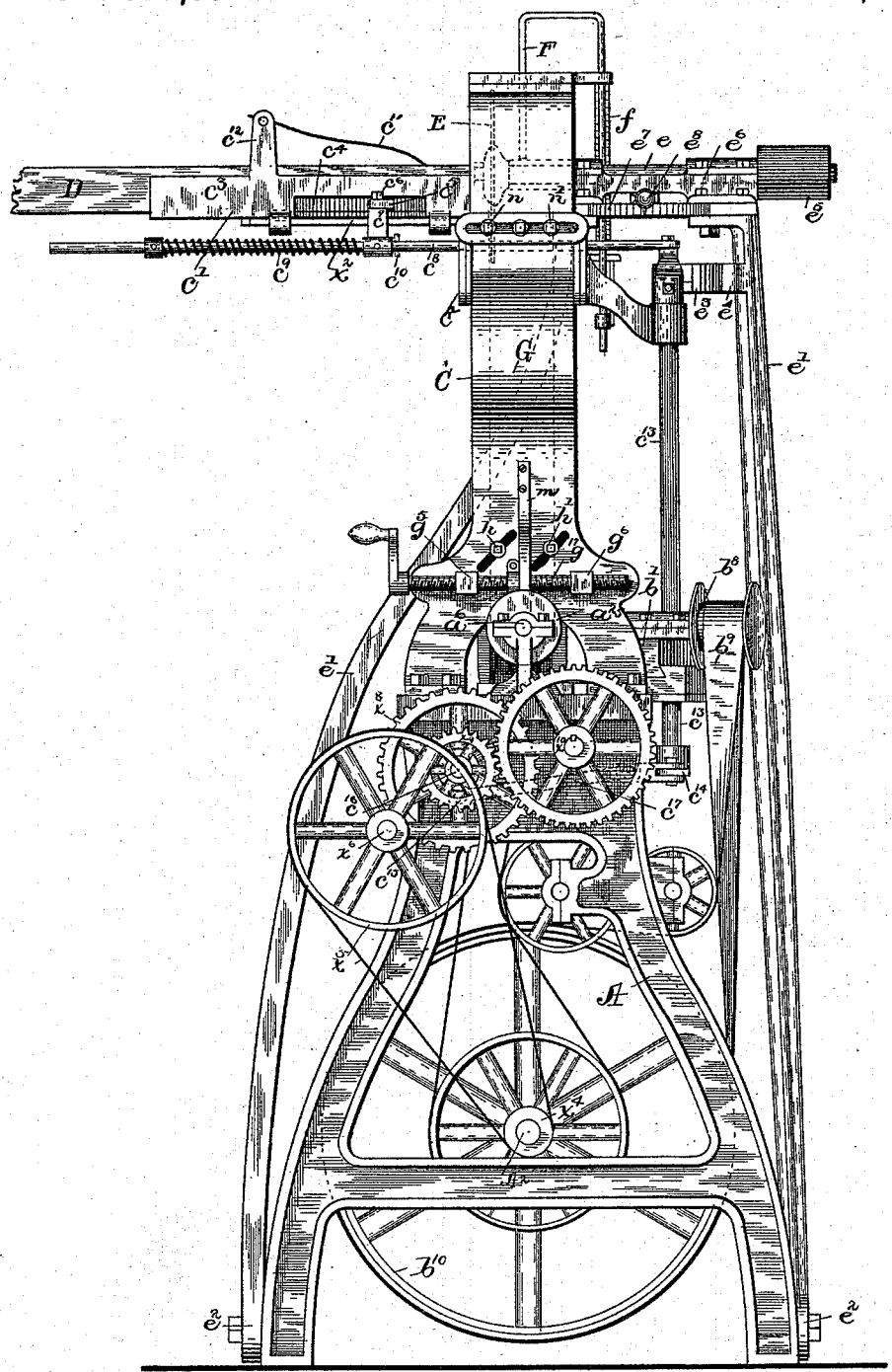
Figure 3:
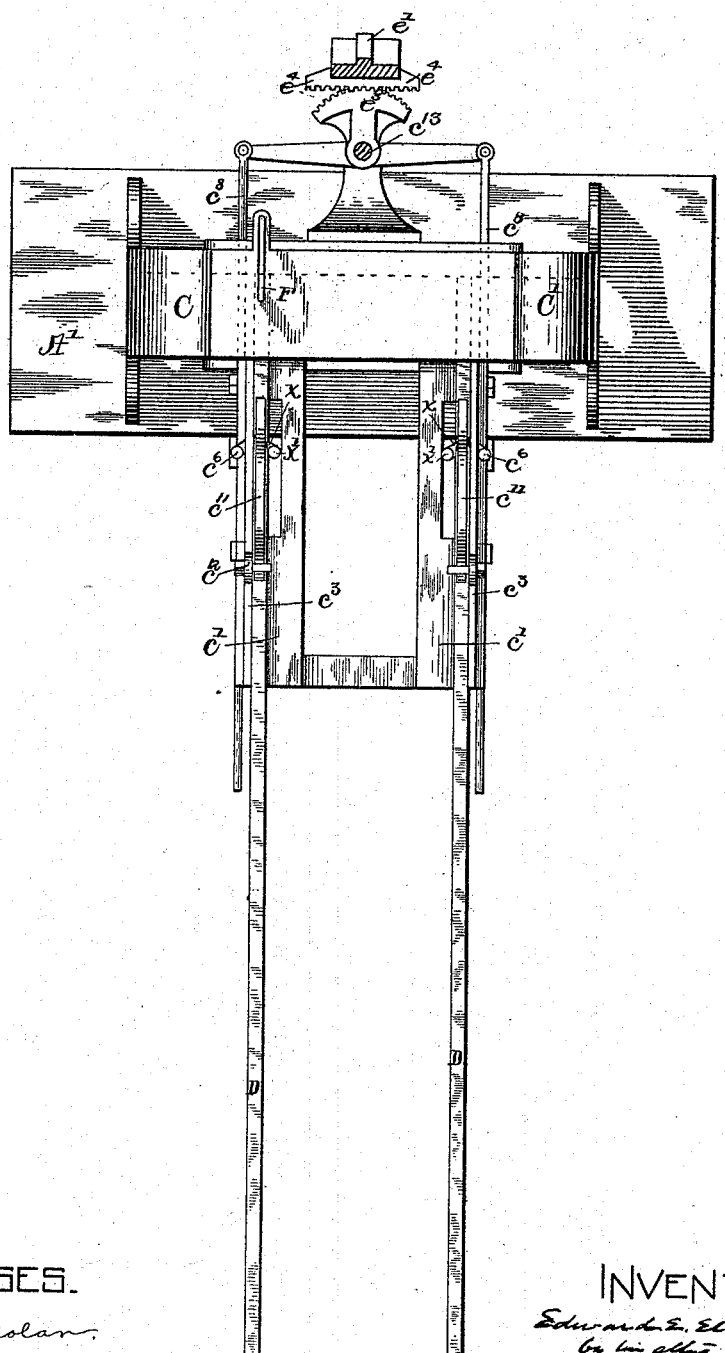
Figure 4:
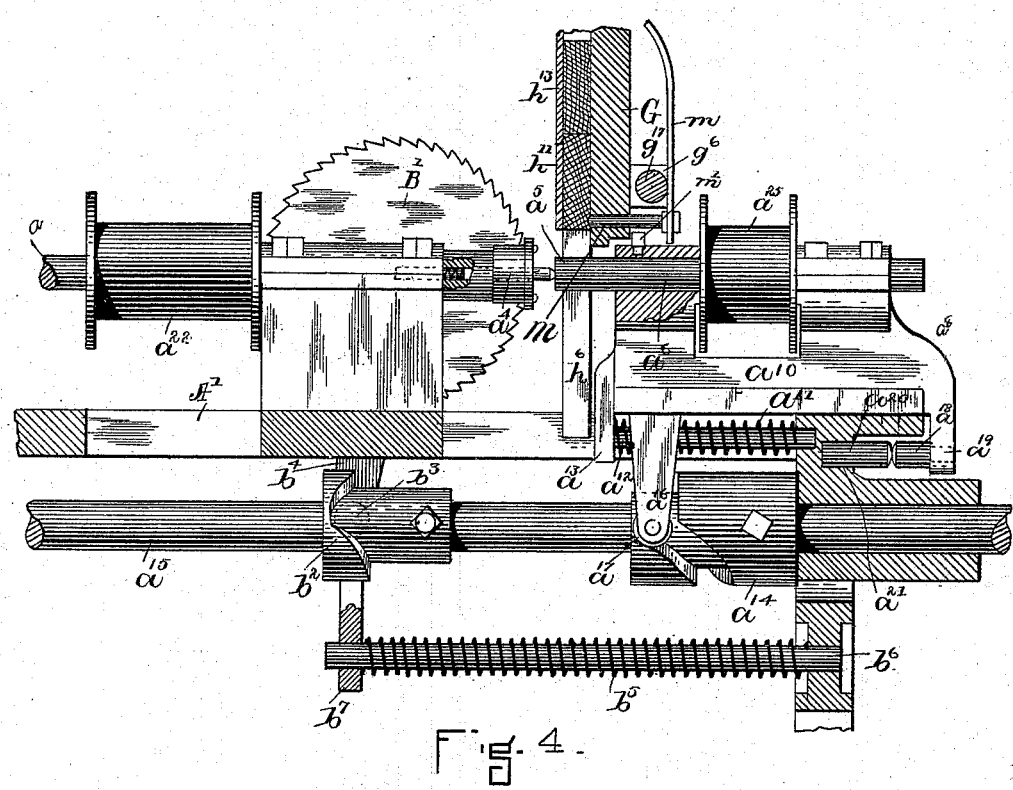
Figures 5, 14:
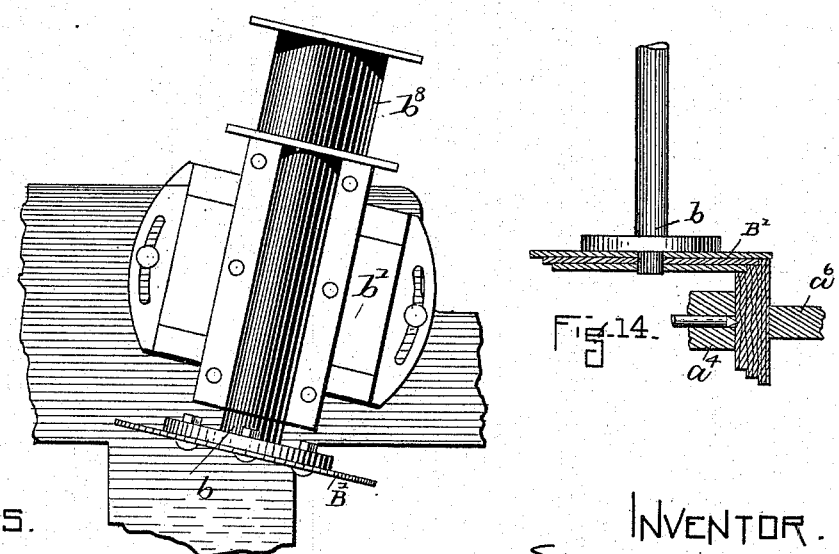

In the drawings,—Figure 1 is a view in front elevation of the machine. Fig. 2 is a view in end elevation thereof. Fig. 3 is a view in plan. Fig. 4 is a view enlarged partly in vertical section and partly in elevation of one section of the machine showing particularly a portion of the block feeding, block holding, and block shaping devices. Fig. 5 is a detail view in plan to illustrate the manner of mounting, operating, and adjusting one of the rotary saws. Fig. 6 is a detail view in front elevation; Fig. 7, a detail view in rear elevation; Fig. 8, a cross section; Fig. 9, a detail view in elevation, and Fig. 10 a view in elevation of devices for changing or varying the width of the feed chute or passage and automatically changing the location of the bottom of the blank stop at the lower end of the feed chute, whereby it is lowered or raised according as the passage is widened or narrowed and blanks increased or decreased in size. Fig. 11 is a detail view illustrating the manner of operating a plunger for moving or starting blanks downward in one of the passages after they have been sawed from the blank strip. Fig. 12 is a view of mechanism for moving a saw for cutting blanks from the blank strip whereby the size of the block may be varied. Fig. 13 represents a modification of a portion of the automatic feeding mechanism. Fig. 14 represents a modification to which reference is hereinafter made. Fig. 15 is a view illustrating the bung strips from which the bungs are made as fed vertically instead of horizontally, as represented in Figs. 1 and 2, and the cutting saws as arranged to cut on vertical axes instead of horizontal axes. Fig. 16 is a view partly in horizontal section and partly in plan upon and below the dotted line of Fig. 15. Fig. 17 is a detail view illustrating the blank block stops hereinafter referred to as operated by a cam rather than by the movable stock, as represented in Fig. 4. Fig. 18 is a detail view to illustrate the use of the distance piece hereinafter referred to, and a single operating cam. Fig. 19 represents the employment of band saws in lieu of circular saws adapted to have the same movement, however, as the circular saws in relation to the rotary blanks in shaping their edges. Fig. 20 is a detail view principally in elevation representing one of the band saws, its supporting drums and slide, and Fig. 21 is a vertical section taken through the slide plate and its supports. Figs. 22 and 23 refer to another form of reducing cutter as an equivalent of the rotary blank edge reducing saws.

The machine is duplex in that it is organized to automatically make two bung blocks, and automatically feed, shape, and deliver the same simultaneously, the duplex mechanism being, however, combined together in the machine to effect a saving in parts, cost of construction, floor space, &c.

A is the frame of the machine. Upon it is mounted a spindle $a$, one end, $a'$, of which serves as a head stock in connection with the tail stock $a^2$ upon the spindle $a^3$, and the other end, $a^4$, of which serves as a head stock in connection with the tail stock $a^5$ upon the spindle $a^6$. The spindle $a$ is journaled in stationary bearings. The end spindles $a^3$ $a^6$ are journaled in bearings $a^7 a^8$ respectively. Each of the bearings is supported upon a slide plate, the bearings $a^7$ upon the slide plate $a^9$, and the bearings $a^8$ upon the slide plate $a^{10}$. These slide plates are movable upon the table A' of the machine to move the tail stocks $a^2$ $a^5$ toward the head stock by springs $a^{11}$, one only being shown (see Fig. 4) where it is represented as surrounding a guide rod $a^{12}$, and bearing against an arm $a^{13}$ extending downward from the plate $a^{10}$. Each of the tail stock slide plates $a^9$, $a^{10}$ is moved away from its respective head stock by means of the cylinder cam $a^{14}$ (see Fig. 4) on the shaft $a^{15}$, the cam for co-operating with the slide plate $a^{10}$ only being shown, the slide plate having an arm $a^{16}$ which carries a cam roll $a^{17}$ to enter the cam groove of the cylinder cam, and the cylinder cam being constructed to operate to move the tail stock away from the head stock only, the remainder of the track being cut out to permit the spring $a^{11}$ to operate to move the tail stock toward the head stock. The extent of inward movement of each tail stock is controlled by means of a stop $a^{18}$ carried by an arm $a^{19}$ of the plate supporting the stock (see Fig. 4), and a removable distance piece or adjusting screw $a^{20}$. I have represented a movable distance piece as being preferable to an adjusting screw, the piece being removable from its socket or holder $a^{21}$ to permit others of greater or less length to be substituted. Each of the head stocks has suitable block-holding pins, and a spring-actuated push rod for disengaging the completed bung from the pins upon the withdrawal of the tail stock. The spindle $a$ carrying the head stocks has a pulley $a^{22}$ which is driven by the belt $a^{23}$ and pulley $a^{24}$ on the main shaft $A^2$. Each of the spindles $a^3$ $a^6$ has a pulley $a^{25}$ driven by a belt $a^{26}$ and pulleys $a^{27}$ on the main shaft $A^2$. (See Fig. 1.)

B B' are the circular saws which shape the bung blocks. They are each supported at the end of a shaft $b$ carried by a compound carriage $b'$ provided with a sliding movement upon the table A' preferably by means of a cam $b^2$ upon the shaft $a^{15}$ (see Fig. 4), and a cam pin $b^3$ upon the arm $b^4$ extending from the carriage $b'$. The cam serves, however, to move the carriage in a direction to move the saw into operative connection with its work, and the carriage and saw are automatically returned upon the completion of the action of the saw by means of the returning spring $b^5$ about the rod $b^6$, and the arm $b^7$ depending from the carriage $b'$ and against which the spring $b^5$ bears. The movement of the carriage $b'$ by the cam compresses the spring. The cam is shaped to permit the spring to quickly return the saw and carriage.

I have represented fully the mechanism for supporting and moving the saw B'. That for operating and moving the saw B is the same.

The tail stock operating cams and the cams for moving the saw carriages are double, that is, they are shaped so that for each complete rotation they impart two operating movements to the head stocks and saws respectively, and two bungs are operated upon and shaped by each saw. Each saw is movable from one face of the bung block to the other or upon a line substantially parallel or slightly inclined according as may be desired to make a bung straight or tapered. The compound carriage $b'$ provides each saw with the necessary adjustments. Each saw is rotated by means of a pulley $b^8$ upon its shaft, a belt $b^9$, and a pulley $b^{10}$ upon the main shaft $A^2$. (See Figs. 1 and 2.)

Thus far the portions of the machine described are like in construction, adjustment, and operation to the similar parts decribed in my said Letters Patent. It is desirable in order to obtain the full benefit of the organization, however, to deliver to the bung block shaping devices bung blocks more rapidly and uniformly than they can be fed by hand, and to accomplish this purpose I use in connection with the devices specified an automatic block making and feeding apparatus, which involves the feeding of a long strip or piece of wood of the desired dimensions as to width and thickness automatically to a saw arranged to cut from the advancing end of the strip bung blocks of the required size as to length, and as the machine has a duplex organization, it is adapted to simultaneously feed two of these long strips. To sever the bung blocks from the ends of these strips there may be used one saw or two. In Fig. 1 I have represented one as employed, and in Fig. 13, two. Each strip is placed on edge and is fed on edge to the saw or saws and the blocks are severed from the strips immediately at the upper ends or openings to the feed ways into which they drop or are forced, and through which they feed by gravity to the clamping and rotary stocks. The entire feed way is made adjustable as to size as will hereinafter be described, and is provided with means for properly holding and presenting to the tail and head stocks blocks of any size.

Referring to the drawings, C represents a casing containing the feed chute through which blocks are delivered to the tail stock $a^2$ and head stock $a'$, and C' a casing containing the chute through which they are delivered to the head stock $a^4$ and tail stock $a^5$. Each chute has a strip feed way $c$ opening into it, and there is arranged to be moved across the strip feed way upon a line and just inside of the front edge of each feed chute a saw E. The strip feed way $c$ is formed in the arm or bracket $c'$ extending horizontally from the top portion or frame $c^2$ by means of the wall $c^3$. There is formed in the wall $c^3$ a slot $c^4$ through which a feed dog $c^5$ projects. This feed dog is pivoted upon a rod or stud $c^6$ carried by a slide block $c^7$, and this slide block is operated by a reciprocating rod $c^8$, the rod passing through a hole in the block and having a spring $c^9$ which bears against one side of the block and serves to hold the block in contact with a stop $c^{10}$ upon the reciprocating rod $c^8$ but upon the other side of the block. The feed dog is placed so that its engaging point is in advance of its center, so that upon its movement in the direction of its point it engages the strip which is marked D (see Figs. 2 and 3), but in the reverse direction it rides upon the strip, the strip remaining stationary. I have represented in the drawings in lieu of the adjustable bar forming one wall of the strip feed way, an additional dog $x$ placed opposite the dog $c^5$. (See Fig. 3) This dog is supported by a stud $x'$ extending upward from a slide $x^2$ (see Fig. 2) connected by a cross arm with the slide block $c^7$, so that both dogs are simultaneously moved. It is not necessary, however, to employ two dogs as one will answer. A flat spring $c^{11}$ supported at one end by a post $c^{12}$ extending upward from the bracket $c'$ bears upon the upper edge of the strip D and holds it in the feed way and prevents it from being moved backward upon the outward movement of the feed dog. The reciprocating feeding movements are imparted to the feed dogs through the rods $c^3$ by means of the rock shaft $c^{13}$ (see Fig. 2), the arm $c^{14}$ secured to its lower end, crank $c^{15}$ on shaft $c^{16}$, and pitman or connecting rod $c^{17}$. Shown in dotted line, Fig. 2.

The feed dog, feeds the strip until its end comes in contact with the inner wall of the feed chute. Upon the feeding of the strips a sufficient extent a section of the inner end of each is severed to form the blank from which the bung is formed by the movement of the circular saw E (see Figs. 1, 11, and 12), which is mounted upon the end of a shaft $e$ carried or supported at the upper end of the long vertical levers $e'$ which are pivoted at their lower ends at $e^2$. The saw is located to be moved across the inner ends of the strip feed way or at the point where they open into the down feed chutes, and horizontal movements are imparted to the saw by means of said levers $e'$ and the rock shaft $c^{13}$, the rock shaft having a segment gear $e^3$ (see Fig. 3) which engages a segment $e^4$ of a slightly curved gear upon the said levers $e'$. This causes the levers to be vibrated back and forth and consequently the saw E to move first across one feed way and then away from it across the other, and the feed of the strips is alternated so that one strip is fed while the saw is operating to sever a block from the other. The saw is rotated by means of a pulley $e^5$ (see Fig. 2) upon the shaft $e$, and a belt. Not shown. To vary the distance of the saw cut from the end of each strip in order that blanks varying in size may be formed, I have shown the saw as made horizontally adjustable. This is accomplished by mounting the boxes of the shaft $e$ upon a slide $e^6$ (see Fig. 11) and arranging upon the plate $e^7$, which forms or is attached to the upper end of the oscillating levers $e'$, guides in which the slide $e^6$ is movable, and the slide is moved in the guides upon this plate by means of the lever $e^8$ pivoted at $e^9$ (see Fig. 11) to the plate $e^7$, and the inner end of which is connected with the slide by a link $e^{10}$. Shown in dotted lines in Fig. 11. The movements of the lever $e^8$ cause the saw E and its shaft to be moved horizontally.

In Fig. 13 I have represented in lieu of one saw E, the use of two saws, one for use with each of the feed chutes. These saws are mounted upon separate shafts carried at the upper ends of the levers $e'$, and are rotated in reverse direction or so that the cutting edge of each is downward in relation to the stop. This is for the purpose of causing the blanks to be started downward in both down feed chutes by the saws. Where a single saw is employed as represented in the principal figures, its cutting edge is operated in a downward direction in relation to the feed chute $C'$, but in an upward direction in relation to the feed chute C, and for this reason it is necessary to use in connection with the feed chute C a plunger for starting the blank fed through it after it has been sawed down the chute. This plunger is lettered F (see Figs. 1, 2, 3, and 12), and it is located over the top of the down chute C, and it is reciprocated first in a downward movement to press or move a bung blank downward in the chute principally by gravity, that is, it is held in an elevated position, or so that the end of the strip from which the blank is made, may be fed under it, by means of a spring latch $f$ which engages a catch $f'$ upon the plunger F. This spring latch is disengaged from the catch by means of a push bar $f^2$ projecting from the end of the oscillating or reciprocating lever plate $e^7$. (See Fig. 12.) This push bar upon the movement of the saw toward the plunger comes in contact with the spring latch, disengages it from the catch, and allows the plunger to fall. The trip latch $f^3$ at the lower end of the bracket $f^4$ upon the lever plate $e^7$ (see Fig. 12) rides over the end $f^5$ of the bent lever $f^6$ which is pivoted at $f^7$ during the movement of the saw toward the plunger F, and the trip latch $f^3$ is shaped and pivoted so that it rides freely over the end of the lever $f^5$ or a rod extending horizontally therefrom, but upon the reverse movement of the lever plate the trip latch $f^3$ which is pivoted and shaped to move only upon the movement of the lever plate toward the plunger but which becomes rigid upon the contact with the end of the bent lever upon the reverse movement of the lever plate, actuates the lever causing its long arm to be lifted and through the link $f^8$ to raise the plunger F until the catch $f'$ is engaged by the spring latch $f$ when the lever has been moved sufficiently to allow the trip latch to clear the end $f^5$ of the lever and the latch then serves to hold the plunger in its elevated or highest position until it is released upon the reverse movement of the lever plate again. When the plunger is allowed to fall or drop its lower end comes in contact with the block which has just been severed by the saw and forces it downward into the chute. While I have shown this positive downward feed of the plunger as connected with one chute, I would not be understood as confining myself to its use therewith, as it may be also used in connection with the other down chute.

Each of the down chutes is adapted to be varied as to width to receive blanks of any size, and this adjustment of the passages is obtained by making the casings which form the chutes expansible laterally. Each chute casing has the main or principal plate G which extends upward from the bed of the machine (see Figs. 1, 2, 6, 7, 8, and 10), and two end sections $g\ g'$, each of which preferably is made of the part $g^2$ having the recess $g^3$ and the part $g^4$ to complete with the part $g^2$ the recess $g^3$. These sections $g\ g'$ are horizontally movable upon the part G by means of the nuts $g^5\ g^6$ (see Fig. 6), one of which is carried by the section $g$ and the other by the section $g'$, and the right and left threaded screw $g^{17}$ which engages said nuts $g^5\ g^6$. The nuts are connected with the sections $g\ g'$ by means of studs passing through slots in the plate G. Each chute has at its lower end a stop $g^7$ upon which the lowermost blank in the chute comes to rest as it falls or drops through the chute, it then being in a position between the tail and head stock, the tail stock acting to bring it against the head stock. As the blanks vary in size from their center toward each side and also toward the top and bottom uniformly, it is necessary in adjusting the size of the feed chute to make provision for the adjustment of the stop $g^7$ in order that the blocks of all sizes may be centrally located in relation to the centers of the tail and the head stocks. This adjustment must be both vertical and horizontal, and it is obtained by forming in the plate G two slots $h\ h'$ which are inclined in the same direction. (See Fig. 6.) The lower portions of the sections $g\ g'$ are formed as represented in Fig. 7, that is, the section $g$ has the part $h^2$ provided with a vertical recess or guide way $h^3$, and the section $g'$ has the part $h^4$ provided with the vertical recess or guide way $h^5$, and there is arranged to fit the vertical recess $h^3$ the plate $h^6$ and to fit the recess or guide way $h^5$ the plate $h^7$ which has the stop $g^7$. The plate $h^6$ has a stud $h^8$ which passes through the slot $h'$ and is headed upon its opposite side, and the plate $h^7$ has a stud $h^9$ which passes through the slot $h$, and is also headed upon its opposite side. As the plate G and its slots are stationary, it follows that upon the movement of the sections $g\ g'$ by means of the adjusting screw $g^{17}$, the plates $h^6\ h^7$ are caused to be moved vertically. If the movement of the sections $g\ g'$ is toward each other, then these plates are caused as they are moved toward each other to also be moved, the plate $h^7$ upwardly and the plate $h^6$ downwardly, and upon a reverse or opening movement of the parts $g\ g'$ the plate $h^6$ is moved upwardly, and the plate $h^7$ downwardly, so that the combined movements produce upon the stop $g^7$ and the cut away section $h^{10}$ of the plate $h^6$ combined horizontal and vertical movements, that is, each is moved at an angle of forty-five degrees to a horizontal line, one downwardly and the other upwardly. In order that the side opening of the chute may be closed and kept closed during the movements of the tail stock, there is attached to the plate $h^6$ the covering plate $h^{11}$ (see Fig. 10) with the inclined upper edge $h^{12}$, and to the plate $g^4$ the covering plate $h^{13}$ with the inclined lower edge $h^{14}$. The edge $h^{12}$ slides upon the edge $h^{14}$ and a constant contact is maintained between them. The lower edge of the plate $h^{11}$ is elevated the width of a bung blank from the stop $g^7$, so that only one blank at a time can be pushed outward from the chute by the tail stock.

To hold the blanks in the chute during the removal of the lowermost one by the tail stock, I employ a spring pin M (see Figs. 1 and 4) which is moved and held so that its inner end comes in contact or rests against the surface of the block next the undermost block by a spring $m$. The spring is allowed to hold the pin in this position only during the transfer of the lowermost block by the tail stock and the operation of the shaping of the bung. Upon the reverse movement of the tail stock a stop or stud $m'$ comes in contact with the lower edge of the spring arm $m$ and withdraws the pin from contact with the block against which it has been held and opens the passage in the chute, so that the block falls by gravity, the lowermost one coming to rest upon the stop $g^7$. The sections $g\ g'$ of the chute casing are fastened in any desired position in relation to each other after they have been adjusted by the adjusting screws by means of locking ends $n$ $n'$. (See Fig. 2.)

The operation of the machine is as follows: The strips from which the blanks are cut are fed through each of the strip feed ways by the strip feeding mechanism in successive order to bring the end of each strip over a down chute. The end of each strip is cut off by the severing mechanism in successive order forming a blank, and the blank dropped through their respective feed chutes to a position to be engaged simultaneously by the horizontally movable tail stocks, and are removed from the chutes by the tail stocks against the head stocks, the remaining blanks in the chutes being held stationary during this movement by means of stops. The blanks are then immediately shaped by the circular saws, and are then returned or released and the tail stocks return to their original position, other blanks made and delivered and dropped into position between the tail and head stocks, and the operation continues automatically in this manner.

The advantages of the invention arise from the rapidity with which blanks are made and presented to the shaping devices, and relate to the combination in one organization of the blank making and the blank shaping devices, and to the various adjustments whereby the machine is adapted to be operated upon blanks varying in size.

Power is communicated from the power shaft $A^2$ to the crank and cam shafts by means of pulley $x^3$ on the power shaft, pulley $x^4$, pulley $x^5$ on the shaft $x^6$, pinion $x^7$ on shaft $x^6$, which meshes with gear $x^8$ on the crank shaft. A small gear $x^9$ on the crank shaft engages with a gear $x^{10}$ on the cam shaft.

For the purpose of feeding the strip or strips from which the blanks are made automatically to the blank shaping devices, I would say that they may be fed vertically to the severing saws instead of horizontally, in which case, of course, the severing saw or saws would have their or its axis vertical instead of horizontal so that the saw would revolve in a horizontal instead of a vertical plane. (See Figs. 15 and 16.) In other respects the saw or saws would be movable in relation to the strip and feed chutes as above specified.

The use of two severing saws, or the construction represented in Fig. 13, is an improvement over a single saw for severing blanks from both strips in that blanks varying in size can be cut from the respective strips and shaped at the same time, or, in other words, the machine by the use of double saws can simultaneously make bungs of two sizes, the one set of shaping devices being adjusted to act upon blanks of one size, while the other set of shaping devices is adjusted to act upon blanks either larger or smaller than those which the first set is acting upon. I would also say that the stops for holding the lowermost blanks in the feed chutes may be positively moved out of position to permit the falling or dropping of the blocks in the chutes by any other moving part of the machine properly timed to accomplish this result than the one named, and to illustrate this I have represented in Fig. 17 a blank stop as operated by a cam upon the cam shaft, and a connecting lever. The cams for operating the tail stocks, &c., may be single instead of double, (see Fig. 18,) as above described, or they may have more than two successive operating faces to a revolution.

I do not confine myself, so far as the bung shaping devices are concerned, to a circular saw, but may use a band saw, (see Figs. 19, 20, and 21,) where band saws bearing the same letters as the circular saws above referred to are shown. Each band saw is mounted upon drums one of which is carried by a shaft driven by a belt, and each pair of drums is supported by a traveling frame or carriage which moves the band saw while it is rotating in the path in which the circular saws B B' are moved, a rotary tenon cutter, (see Figs. 22 and 23) or any other rotary cutting tool having its axis in the same relation to the rotating blank and movable in relation thereto as is provided the circular saw. I would also say that in lieu of one shaping circular saw B or rotary shaping device, two or more saws or shaping devices may be employed, in which event the saws or devices may or may not be graduated as to diameter, and when graduated as to diameter the one having the smaller or smallest diameter is upon the extreme end of the shaft or nearest the rotating bung blank, the next largest being the second in order, and so on, and in Fig. 14 I have illustrated the use of a gang of three circular saws varying in size or diameter as above specified. The view represents the relation which the various saws when graduated bear to a rotating bung blank while at work, but as I have above stated, the gang of saws may be of the same diameter, or substantially the same diameter. By using a number of rotary cutting tools upon the same shaft I obtain an improved action in that the work or labor of the inner saw or cutting tool, or the tool having the smallest diameter, is lessened, the other saws or tools acting to remove the outer sections of the blank which the inner saw or tool would be obliged to remove if one only were employed.

I would say that the use of a gang of saws or cutting tools quickens the action of the machine, as two or more saws or cutting tools simultaneously operating upon the blank can shape it in a less time than one. This is also true in relation to the use of two or more band saws. As a rule I prefer to use the circular saw whether arranged singly or in gangs.

It will be observed that the lower side section $h^7$ of the chute carries the stop $g^7$ and that the lower side section $h^6$ of the chute is cut away at $h^{10}$ opposite the stop. As the blanks fed to the chuck are square it follows that when the blank is changed as to size the sections $g$ $g'$ $h^6$ $h^7$ of the chute must be moved toward or from each other according as the blank is decreased or increased in size, and that the stop $g^7$ must be correspondingly raised or lowered, and that the cut away section $h^{10}$ must be correspondingly lowered or raised.

It will be understood, of course, that the blanks dropping through the vertical chute come to rest in successive order upon the stop $g^7$ and between the two heads of the chuck and that each one is then removed by the chuck to an operative position in relation to the reciprocating rotary blank edge shaping or turning devices, and that the finished bung is then returned to the chute so changed or reduced in shape that it is no longer held in place by that portion of the vertical side of the piece or section $h^6$ above the cut away section $h^{10}$, but may then roll or move over the stop $g^7$ into and by the cut away section $h^{10}$, and thus automatically drop from the chute and make way for the next blank in order.

Having thus fully described my invention, I claim and desire to secure by Letters Patent of the United States—

1. In a machine for making bungs the combination of the following instrumentalities, a horizontal feed-way and a reciprocating strip feed to feed a blank forming strip in said feed-way to the action of a cutting saw; a cutting saw to sever bung blanks from the strip having a reciprocating movement across the feed-way; a feed chute extending from the end of the feed-way to a rotary blank holding chuck, said rotary blank holding chuck and means whereby the said chuck is opened to receive a blank, then closed upon it, and transferred to present it to the reciprocating rotary edge shaping mechanism, and then returned with the finished blank to its original position and opened to release it and the said reciprocating rotary blank edge shaping mechanism, as and for the purposes described.

2. The combination in an organized duplex bung blank making machine of two strip feed-ways held by or arranged upon a common frame; a reciprocating strip feed for each feed-way, adapted to be alternately reciprocated therein to feed the blank forming strips in each feed-way alternately to a common blank severing saw; a reciprocating blank severing saw movable alternately across each feed-way to sever in successive order a blank from the end of each strip; a blank feeding chute extending from the end of each feed-way to traveling blank holding chucks, said chucks having a rotary movement and means whereby said chucks are held open to receive the blanks and transferred to present them to the action of the reciprocating rotary edge shaping devices, and are then returned with them to their original position and are then opened to release them and the said reciprocating rotary edge shaping devices; and a common actuating shaft connected with the various devices substantially as specified, as and for the purposes set forth.

3. The combination, in a bung making machine, of the strip feed way, the feed dog, its actuating rod, the dog holding block having a limited movement upon the actuating rod between a spring and a stop, substantially as described.

4. The combination in a bung making machine of a horizontal feed-way; a vertical chute extending from its inner end; a strip feeding mechanism to feed the end of the strip over the entrance to the vertical chute; a reciprocating saw mounted upon a horizontal axis to revolve upon a vertical arc, movable across the line of the feed at the forward end of the vertical chute and rotated to cut downward, whereby the saw acts not only to sever the blank, but to force or move downwardly the severed blank in the vertical chute, substantially as described.

5. The combination in a bung making machine of a horizontal strip feed-way; a vertical chute extending from its end; a reciprocating feed-dog; and a horizontally reciprocating severing saw mounted upon a horizontal shaft, and movable across the feed-way at its juncture with the vertical chute, with a vertical shaft connected with the saw carriage or slide, and by a yielding connection with the dog-feed, as and for the purposes set forth.

6. The combination, in a bung making machine, of the strip feed way, the feed dog, its actuating rod, the crank $c^{15}$, the rock shaft $c^{13}$ connected at its upper end with the actuating rod $c^8$, substantially as described.

7. The combination in a bung making machine having a duplex organization of two horizontal feed-ways; a reciprocating strip feed-dog for each feed-way; a vertical chute extending from the end of each horizontal feed-way; a blank severing saw mounted upon a horizontal shaft carried by a horizontally movable slide and devices, substantially as specified, for reciprocating the saw slide to move the saw alternately across each feed-way at its juncture with the vertical chute, and to reciprocate the feed-dogs, substantially as described.

8. The combination in a bung making machine of a horizontal feed-way; a vertical feed-chute extending downward from its inner end; a reciprocating blank strip feed to feed a blank in said feed-way; a reciprocating saw movable across said feed-way at its juncture with the vertical chute; and a plunger movable in the section of the feed-way above the vertical chute, to push the severed blanks in successive order down the chute, as described.

9. The combination, in a bung making machine, of a chute and a plunger F, a latch for holding it elevated, a lever connected by a link therewith adapted to be moved by a moving part of the machine to lift it and a lever releasing arm or slide, substantially as described.

10. The combination of the vertical chute, the strip feeding devices, the plunger F, the traveling saw and its frame, the catch $f'$ upon the plunger, the latch $f$, the bent lever $f^6$ pivoted at $f^7$ and connected by a link $f^8$ with the plunger, and the trip latch $f^3$ supported by the saw carriage, substantially as described.

11. The combination in a bung making machine of the horizontal feed-way and its strip feed; the vertical chute extending from the inner end thereof formed with adjustable sections $g\ g'$; the saw B' movable across the horizontal feed-way at its juncture with the vertical chute; the blank stop; the rotary traversing and holding chuck; and the reciprocating rotary blank edge shaping devices, as and for the purposes described.

12. The combination, in a bung making machine, of the blank feeding chute with the plate $h^6$ extending below the stop $g^7$ to form a section of a guide and cut away at $h^{10}$ so that its remaining or lower guiding surface is out of line with its upper guiding surface, as and for the purposes described.

13. The combination in a bung making machine, of the blank feeding chute made in adjustable sections to vary the width of the chute, and independent adjustable plate $h^6$ cut away at $h^{10}$ as specified, and having a combined horizontal and vertical movement in relation to the remainder of the chute, as and for the purposes described.

14. The combination, in a bung making machine, of the feed chute with the two independent plates $h^7$ $h^6$ forming a portion of the lower end only of the feed chute, one of which has the stop $g^7$ and the other of which is cut away upon its side to form a clearing space or recess $h^{10}$, the edges of which form sides of the feed chute above the point of engagement of the stops with the blank and at the point and also below the point of said engagement, and adjusting devices for varying the relative positions of the two plates $h^6$ $h^7$, as and for the purposes described.

15. The combination of the section $g$ having at its lower end a guide way, the plate $h^6$ arranged to slide in said guide way, the section $g'$ having at its lower end a guide way, the plate $h^7$ in said guide way, slots or recesses $h$ $h'$ in the plate G, a stud extending from the plate $h^6$ into the recess or slot $h'$, a stud extending from the plate $h^7$ into the recess or slot $h$, and means for moving the sections $g$ $g'$ toward and from each other to vary the width of the chute, and whereby at the same time the plate $h^6$ is moved upwardly as it is moved outwardly with the section $g$, and the plate $h^7$ is moved downwardly as it is moved outwardly with the section $g'$, and vice versa, substantially as described.

16. The combination, in a bung making machine, of the plates $h^6$ $h^7$ movable in relation to each other as specified, and the covering plate $h^{11}$ attached to the plate $h^6$ and movable therewith, and having the inclined upper edge $h^{12}$ and the covering plate $h^{13}$ attached to the plate $g^4$, and having the inclined lower edge $h^{14}$, substantially as described.

17. The combination of the feed chute, the plates $h^7$ $h^6$ shaped to provide a stop for the bung blanks and clearance as specified, and also to provide a guide way below the point of engagement of the stock with the blank, and adjustable in relation to each other as described, with the sliding rotary tail stock, the rotary head stock, and a cutting tool arranged and operated to have the line of movement of its cutting edge movable across the plane of rotation of the bung blank held by the stocks, as and for the purposes described.

18. The combination in a bung making machine of a rotary and sliding tail stock, a rotary head stock, the feed chute rectangular in cross-section, the vertically movable plate $h^{11}$, the vertically adjustable stop $g^7$ and the blank holding pin M, as and for the purposes described.

19. In a machine for making bungs from flat bung blanks sawed or cut from a long blank forming strip, the combination of rotary bung blank holding and turning devices for holding the square or flat blank between them and presenting its edges to a gang of rotary cutting saws or tools, with said gang of rotary cutting saws or tools arranged upon a common operating axis or shaft, the center of which extends in a direction radial to the axis of rotation of the bung blank, and which shaft with the gang of saws or tools is moved lengthwise the axis of the rotation of the bung blank, whereby the blank is reduced to shape by a series of cutting instruments moved across the path of its rotation from one surface to the other and revolving in a plane which is at a right angle or very nearly at a right angle to the plane of its revolution, as and for the purposes described.

20. In a bung making machine the combination of a blank holding and turning device for holding a square bung blank with its grain in part presented to the action of rotary cutting devices, with a gang of two or more rotary cutting saws or tools, arranged upon a common shaft movable on a line parallel or very nearly parallel with the axis of revolution of the blank holding devices and caused to rotate during said movement, which saws or cutting tools are of diameters increasing in length from the outer one inwardly, whereby the said blank is reduced to shape by the combined action of a series of cutting edges advanced or moved while rotating upon an axis at or very nearly at a right angle to the plane of rotation of the blank, as and for the purposes described.

EDWARD E. ELDER.

Witnesses:
F. F. RAYMOND, 2d,
J. M. DOLAN.